United States Patent [19]

Savard

[11] Patent Number: 4,875,615

[45] Date of Patent: Oct. 24, 1989

[54] VAPOR PLUG FOR TEMPORARILY SEALING OR PLUGGING A PIPELINE

[75] Inventor: Donald D. Savard, Edmonton, Canada

[73] Assignee: Interprovincial Pipe Line Company, Edmonton, Canada

[21] Appl. No.: 319,169

[22] Filed: Mar. 6, 1989

[51] Int. Cl.$^4$ ............................................. B23K 37/00
[52] U.S. Cl. ................................. 228/119; 228/44.5; 228/49.3; 29/402.13; 219/59.1; 166/135
[58] Field of Search ............... 228/119, 42, 44.5, 49.3, 228/214; 29/402.08, 402.13; 219/59.1, 61.1, 60 R, 60 A; 166/135

[56] References Cited

U.S. PATENT DOCUMENTS

| | | | |
|---|---|---|---|
| 3,194,466 | 7/1965 | Davis | 228/42 |
| 4,648,544 | 3/1987 | Puisais et al. | 219/61.1 |
| 4,762,266 | 8/1988 | Schröder et al. | 29/402.13 |
| 4,828,160 | 5/1989 | Sundholm | 228/42 |

FOREIGN PATENT DOCUMENTS 1596  1/1982  Japan ............................ 228/119

Primary Examiner—Richard K. Seidel
Assistant Examiner—Samuel M. Heinrich
Attorney, Agent, or Firm—Fields, Lewis, Pittenger & Rost

[57] ABSTRACT

The vapor plug can be inserted into an open end of a pipeline. It comprises a hydraulic cylinder carrying a vertically disposed, elastic, resilient seal ring. The cylinder may be hydraulically actuated to expand the ring radially to seal the bore of the line. The hydraulic lines to and from the cylinder chamber may be blocked to lock the plug in the expanded mode. A plunger valve, responsive to pipeline pressure, controls a hydraulic fluid passage connecting the ends of the cylinder chamber. When the plunger valve is in the closed mode, it prevents fluid moving between the chamber ends. When the valve is moved by pipeline pressure to the open mode, fluid can move freely between the chamber ends, thereby permitting the ring seal to contract, to unseal the bore. The plug may then be pumped down the line and recovered at a pig trap.

4 Claims, 5 Drawing Sheets

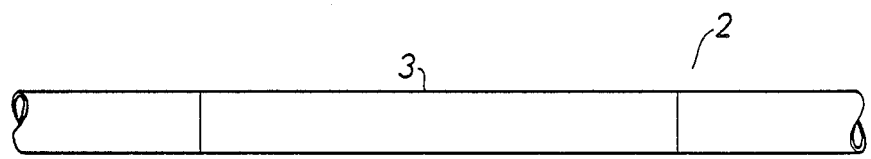
Fig. 1a. SECTION OF PIPE TO BE REMOVED.
Fig. 1b. REMOVE SECTION OF PIPE. INSTALL & SEAL VAPOUR PLUGS.
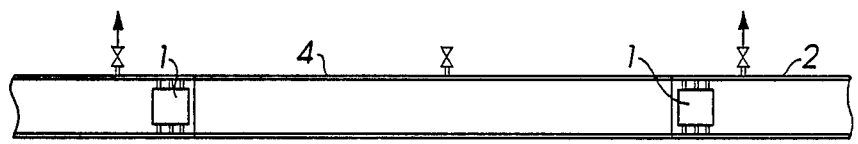
Fig. 1c. WELD IN NEW SECTION OF PIPE.
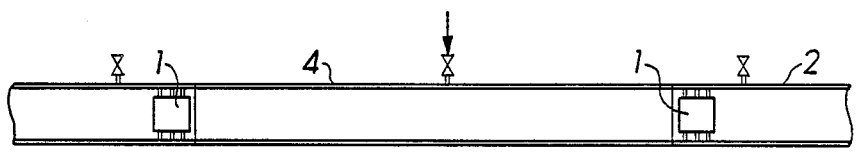
Fig. 1d. RELEASE VAPOR PLUGS BY PRESSURIZING BETWEEN PLUGS.
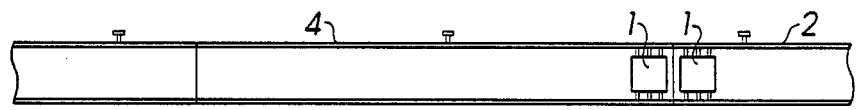
Fig. 1e. PUMP VAPOR PLUGS DOWN PIPELINE.

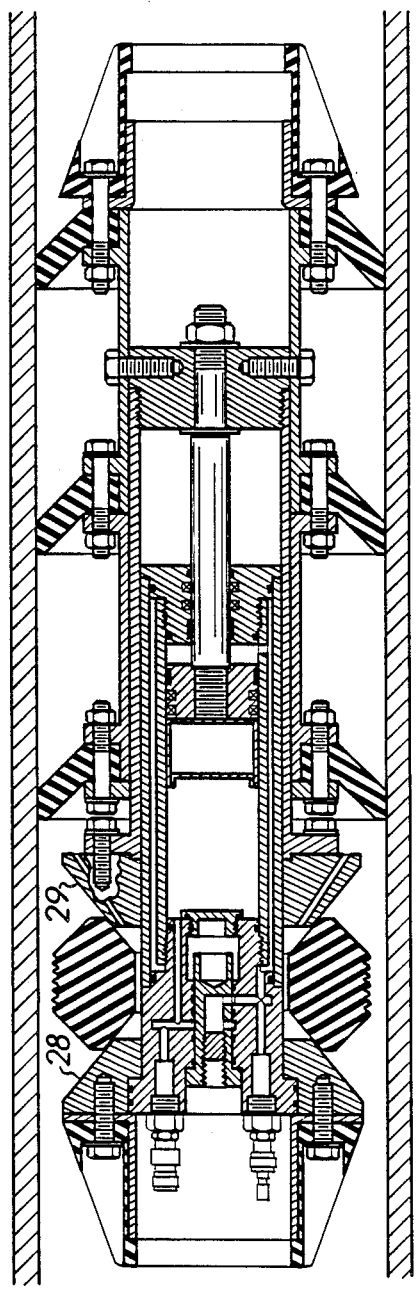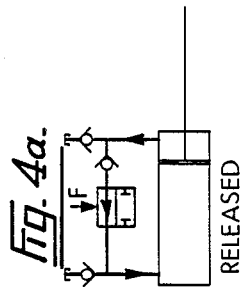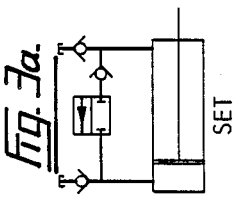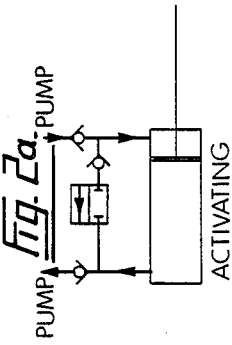

VAPOR PLUG FOR TEMPORARILY SEALING OR PLUGGING A PIPELINE

FIELD OF THE INVENTION

The present invention relates to a vapour plug for temporarily sealing or plugging a pipeline.

BACKGROUND OF THE INVENTION

When a defect manifests itself in the wall of a natural gas or oil transmission pipeline, it is the common practice to cut out a section of pipe, having the defect in it, and to weld in a substitute length of new pipe.

Before welding can occur, it is necessary to seal off each of the open ends of the pipeline, to prevent migration of hydrocarbon gases into the welding area. In the past, plugging has been accomplished by stuffing a charge of aqua gel into the open end of the pipeline. After the pipe section substitution has been made and the line has been placed back into service, the fluid being transmitted gradually removes the gel particles without damage to the line equipment.

However, the gel plugs can slump and gas may leak through to the weld area. This occurrence has led to some serious accidents. In addition, the gel is viewed as an unwanted contamination if a high quality fluid, such as jet fuel, is being shipped.

It is therefore desirable to develop a reliable expandable/contractable mechanical vapor plug for temporarily sealing the bore of a pipeline. However, the problem to be solved is how to collapse the expanded plug for removal, once the substitute length of line has been welded into place and one cannot physically get at the plug.

SUMMARY OF THE INVENTION

A specific form of the vapor plug, that has been developed in accordance with the present invention, combines the following features:

A cylinder, preferably hydraulic, is provided. The cylinder carries a pair of opposed, axially movable annular wedges. The cylinder is operative, when actuated, to move the wedges together. An elastic resilient vertical seal ring is seated between the wedges. As the wedges come together, the seal ring is expanded radially until it seals against the inner surface of the pipeline wall. The seal ring, wedges and cylinder cooperate to seal the pipeline bore;

The cylinder is associated with first and second hydraulic lines or passages for the supply of actuating fluid to one end of the cylinder chamber and removal of fluid from the other end. These passages each incorporate normally closed valve means, such as check valves, for locking the fluid in the chamber, whereby the cylinder piston (which preferably actuates the wedge means) may thereby be locked to fix the seal ring in the expanded mode;

A third passage is provided which, when uninterrupted, enables actuating fluid to move freely from one end of the cylinder chamber to the other. A valve is provided to control flow through this third passage. This valve is responsive to pressure applied in the pipeline bore, whereby it may open or complete the third passage so that the actuating fluid may move between the cylinder chamber ends, thereby freeing the piston for axial movement. Preferably, the valve comprises a plunger forming a transverse bore and having its outer or exposed end face exposed to the pressure in the pipeline bore. Prior to insertion of the plug in the pipe, the plunger would have been set manually to position its bore out of register with the remainder of the third passage, thereby interrupting the latter. But when line pressure is applied to its outer end face, the plunger may shift inwardly to bring its bore into register with the remainder of the third passage, thereby completing and opening the passage for fluid flow;

When the third passage is so opened, the elastic resilient nature of the seal ring causes it to contract and retract the wedge attached to the cylinder piston, so the seal ring may resume the initial or collapsed position. The contracted plug may then be pumped down the pipeline in the manner of a pig and recovered and removed at a pig trap.

In summary then, the plug is expandable to a sealing condition, it's lockable in the expanded state, and it is self-contracting in response to pressure applied through the pipeline bore.

Broadly stated, the invention is a vapor plug, adapted to be inserted into the open end of a pipeline and actuated to expand radially to seal the bore of the pipeline, said plug further being adapted to contract in response to the application of pressure through the bore of the pipeline, comprising: a cylinder forming a chamber and having a fluidtight piston positioned to work therein; first passage means for injecting fluid into one end of the chamber and second passage means for removing fluid from the other end of the chamber; means forming a third passage for enabling fluid to move from one end of the cylinder chamber to the other; a valve, in communication with the bore of the pipeline and adapted to control fluid flow through the third passage, said valve being operative to be moved from a closed mode, in which fluid is blocked from moving through the third passage, and an open mode, in which fluid may move through the third passage, thereby freeing the piston for axial movement in the chamber, said valve being adapted to be moved from the closed mode to the open mode in response to the application of pressure in the bore of the pipeline; and elastic resilient seal ring carried by the cylinder piston and extending in a generally vertical plane, said ring being adapted, when expanded radially, to seal against the inner surface of the pipeline wall; means, connected with the cylinder piston, for radially expanding the seal ring; and normally closed valve means operative to close the ends of the first and second passage means to lock fluid in the cylinder, whereby the piston may be fixed in the ring-expanded mode, when the valve is in the closed mode; said seal ring being operative, when the valve is in the open mode, to contract, whereby the plug may be pumped down the pipeline.

In another broad aspect, the invention involves a method comprising cutting a length of pipe out of a pipeline, said length having a defect; inserting into each open end of the pipeline a mechanical plug comprising a hydraulic cylinder, said cylinder carrying a vertically disposed, elastic, resilient seal ring and being adapted, when hydraulically actuated to radially expand the seal ring into sealing engagement with the inside surface of the pipeline wall, whereby the cylinder and seal ring seal the pipeline bore, said cylinder further comprising means for normally locking the fluid in it so that the seal ring remains expanded, said cylinder further comprising means responsive to pressure applied through the bore of the pipeline and operative to permit the fluid in the cylinder to move freely between the ends of the cylinder chamber, whereby the seal ring may contract; injecting hydraulic fluid into the cylinders to expand them into sealing relation with the pipeline wall; welding a length of new pipe to the open ends of the pipeline to complete the pipeline; pressurizing the pipeline bore to contract each seal ring; and pumping the contracted plugs downstream for recovery thereof.

DESCRIPTION OF THE DRAWINGS

FIGS. 1a to 1e are schematics illustrating the utilization of the plug in connection with the installation of a substitute length of pipe;

FIG. 4 is a sectional side view showing the plug in the collapsed or released mode with the plunger now driven in, in response to pipeline pressure, so that the passage, between the head and rod end sections of the cylinder chamber, is complete and open;

FIGS. 2a, 3a and 4a are simplified schematics showing the hydraulic circuit of the plug when in the three modes shown in FIGS. 2, 3 and 4 respectively.

DESCRIPTION OF THE PREFERRED EMBODIMENT

Figure 2:
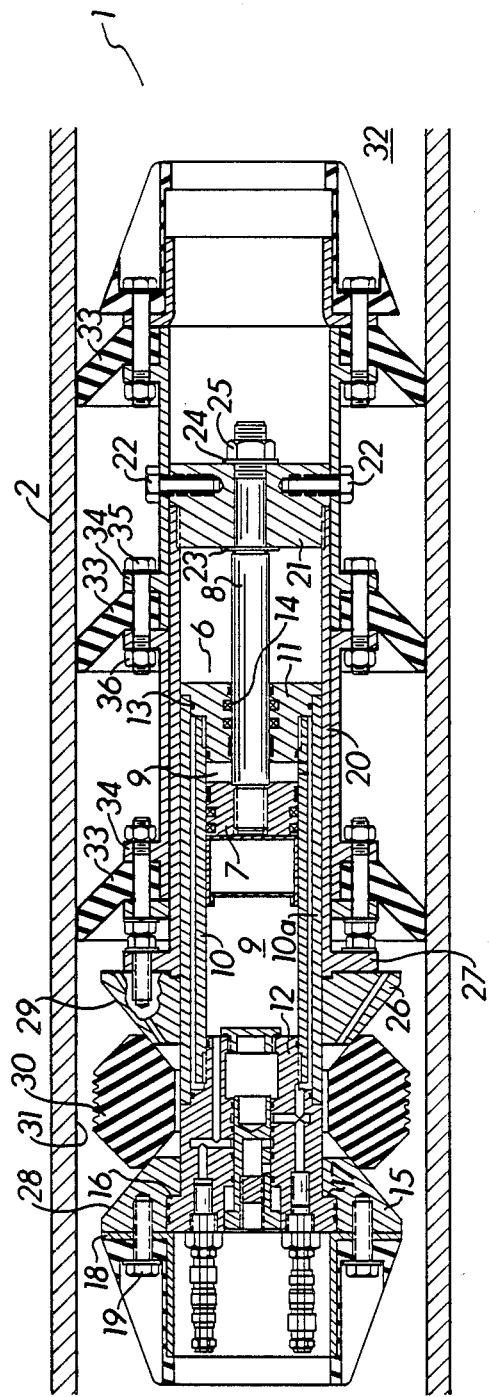
FIG. 2 is a sectional side view showing the plug in a pipeline at the start of the activating process, with the plunger or valve in the retracted interrupting position.
Figure 3:
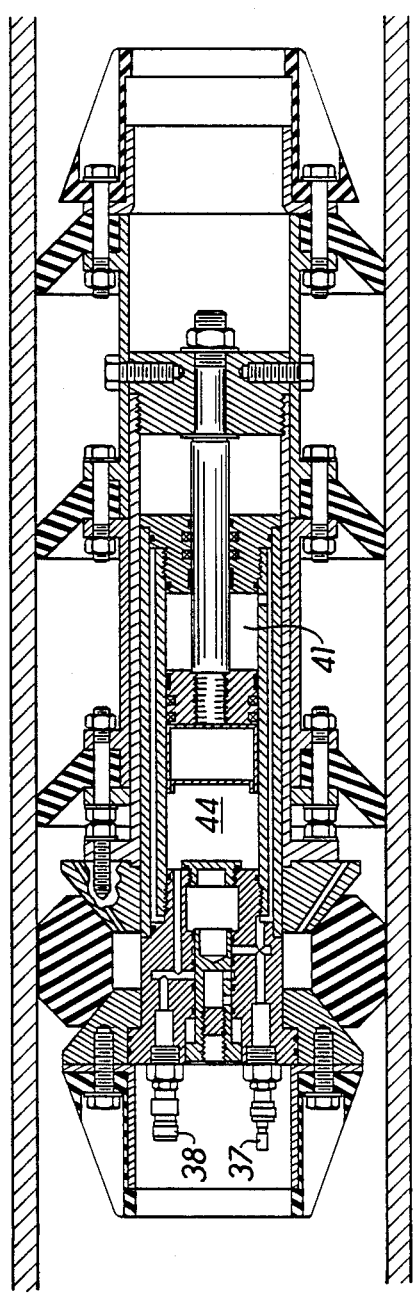
FIG. 3 is a sectional side view showing the plug in the expanded or set mode with the plunger retracted so that fluid cannot move from one end of the cylinder chamber to the other.
Figure 5:
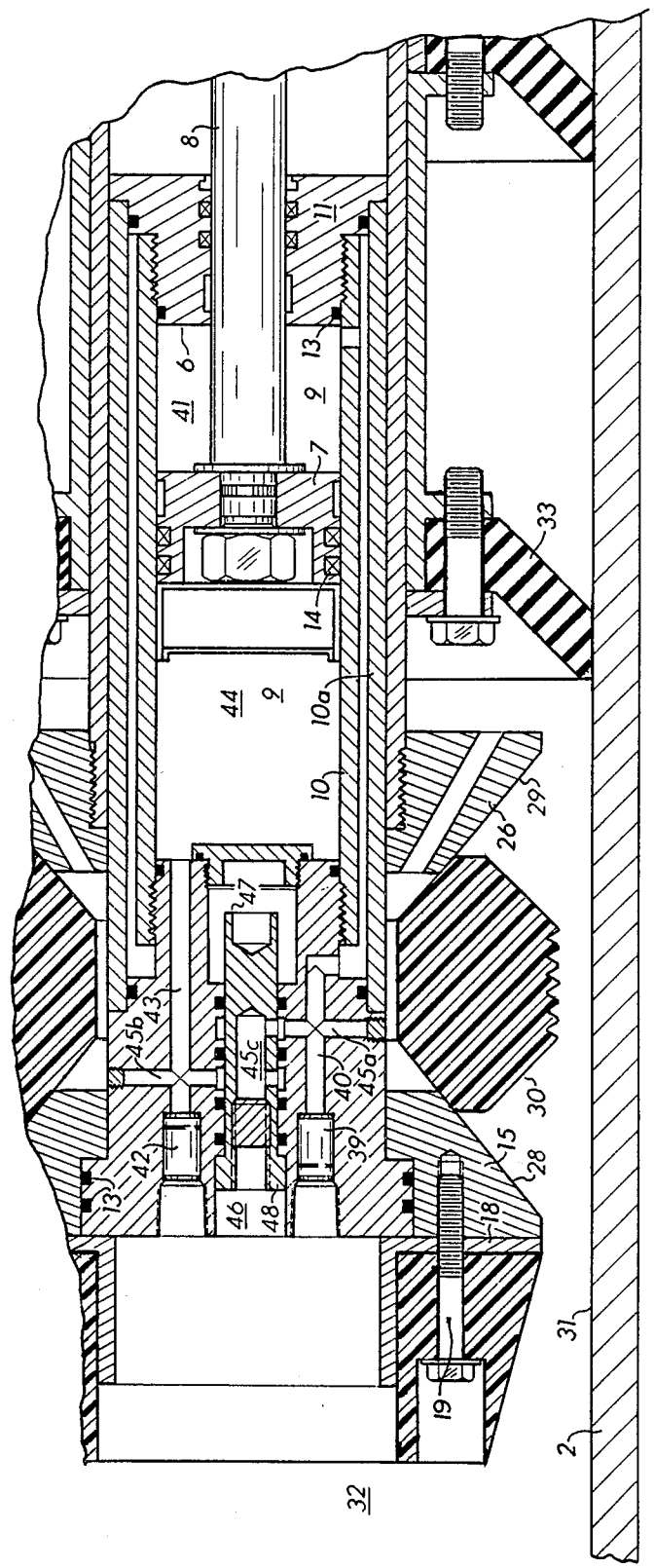
FIG. 5 is a sectional side view showing part of the plug in enlarged form.

The vapor plug 1 of the invention finds particular application in connection with repairs of a pipeline 2. The repair normally involves removal of a pipe section 3, which has a wall defect, and the subsequent insertion of a replacement pipe section 4.

As shown in FIG. 1, a plug 1 is inserted into each open end 5 of the pipeline 2 (after the defective section 3 has been removed) to prevent hydrocarbon gases leaking into the area where welding is to occur.

The plug 1 comprises a hydraulic cylinder 6 having a fluid-tight piston 7 and rod 8 working in the cylinder chamber 9. The body of the cylinder 6 is in three parts and consists of a central tube 10, a rod-end cap 11, and a head-end cap 12. The caps 11, 12 are screw-threaded into the ends of the tube 10. An outer tube 10a is concentric with the tube 10 and extends between the caps 11, 12.

A multiplicity of rubber O-rings 13 (shown in black) and polyurethane seals 14 (indicated by "X") are provided as shown, to seal the unit.

An annular wedge 15 is mounted around and secured to the outer end of the head-end cap 12. More particularly, the head-end cap 12 forms an annular shoulder 16. The wedge 15 is counterbored as shown to form a shoulder 17 for locking with the cap shoulder 16. An end ring 18 abuts both the end surfaces of the wedge 15 and the head-end cap 12 and is secured to the wedge 15 by a bolt 19, so that the three parts form a solid unit.

A sleeve 20 is positioned around and is contiguous to the inner end of the tube 10a. The sleeve 20 can slide along the tube 10a and is connected to the piston rod 8 by a sleeve cap 21 and bolts 22. The sleeve cap 21 is affixed to the piston rod 8 by washers 23, 24 and nut 25. In summary then, the sleeve 20 is connected with the piston rod 8 for lineal movement therewith.

An axially movable second annular wedge 26 is positioned on the tube 10a at the outer end of the sleeve 20. The wedge 26 is bolted to a lug 27 affixed to the sleeve 20. Thus the second wedge 26 is connected with the sleeve 20 and piston rod 8 and is linearly or axially movable with them.

The slanted faces 28, 29 of the first and second wedges 15, 26 are opposed, as shown.

An elastic resilient seal ring 30 is seated on the slanted faces 28, 29 of the spaced-apart wedges 15, 26. Lineal movement together of the wedges 15, 26 will cause the faces 28, 29 to expand the seal ring 30 outwardly and radially into abutting sealing relationship with the inner surface 31 of the pipeline 2. When the seal ring 30 is so expanded, it combines with the stationary wedge 15 and cylinder 6 to seal the bore 32 of the pipeline 2.

A plurality of flexible pig rubber rings 33 are secured to the outer surface of the sleeve 20 by welded brackets 34, bolts 35 and nuts 36. When the seal ring 30 is in the collapsed or released mode shown in FIG. 4, upstream fluid pressure acting against the cylinder 6 and the pig rubber rings 33 will move the plug 1 along through the pipeline bore 32 to a pig trap (not shown) where the unit may be removed from the line.

The cylinder 6 is activated by injection of hydraulic fluid introduced through an inlet quick coupling 37. Excess fluid is returned through an outlet quick coupling 38. Hoses (not shown) connected to a hydraulic pump and reservoir (also not shown) may be attached to the couplings 37, 38, provided that the pipe line end 5 is open.

A first check valve 39 is connected with the inlet quick coupling 37. This check valve 39 in turn is connected with a first passage 40 formed through the body of the cylinder 6. The passage 40 communicates with the rod end section 41 of the cylinder chamber 9.

A second check valve 42 is connected with the outlet quick coupling 38. This check valve 42 in turn is connected with a second passage 43 formed through the body of the cylinder 6. The second passage 43 communicates with the head end section 44 of the cylinder chamber 9.

Thus hydraulic fluid may be pumped into the rod end section 41 of the chamber 9 through the first check valve 39 and passage 40 and may be returned from the head end section 44 through the passage 43 and second check valve 42. When the hydraulic fluid hoses are disconnected and there is no longer fluid pressure being applied, the check valves 39, 42 close and lock in the fluid in the cylinder 6. As a result, the piston 7, rod 8, sleeve 20 and travelling wedge 26 are locked and the seal ring 30 is retained in the expanded mode.

A pair of branch passages 45a, 45b extend toward each other from the first and second passages 40, 43. There is a gap between the ends of the branch passages formed by an axial bore 46 extending into the head-end cap 12.

A cylindrical plunger or valve 47 is positioned in the axial bore 46. This valve 47 forms a passage 45c extending through its body. The outer end face 48 of the valve 47 is exposed to the pipeline bore 32. The valve 47 can be manually pulled to a "closed" position (shown in FIG. 2) wherein the valve passage 45c is out of register with the branch passages 45a, 45b. In this mode, the valve 47 blocks fluid flow between the head and rod end sections 44, 41 of the cylinder chamber 9. If pressure is applied through the pipeline bore 32 against the exposed end face 48 of the valve 47, the valve will be biased to the "open" position (shown in FIG. 4), wherein the passages 45a, b, c are in register and fluid may flow freely between the rod and head ends 41, 44 of the cylinder chamber 9.

In operation, a plug 1 is inserted into each open end 5 of a pipeline 2 after the defective pipe section 3 has been removed. The pig rubber rings 33 center each plug 1 in the pipeline bore 32. The pig rubber rings 33 are reversed beforehand for the left plug 1 (having reference to FIG. 1), so that the rings 33 of the two plugs 1 are similarly slanted. The description of operation will now be continued with respect only to the right hand plug shown in FIG. 1. With the plug 1 in place, hydraulic fluid supply and return hoses are attached to the quick couplings 37, 38. The fluid passages 40, 43, and 45a, b, c and the rod and head-ends 41, 44 of the chamber 9 will have previously been filled with hydraulic fluid, at time of assembly, with the valve 47 in the open position. The valve 47 will have previously been retracted to the closed position. Hydraulic fluid is now pumped through the first passage 40 to drive the piston 7 to the left or upstream end of the chamber 9. The sleeve 20, being attached to the piston rod 7, is also moved to the left. This brings together the stationary and travelling wedges 15, 26 and radially expands the ring seal 30 into sealing engagement with the inner surface 31 of the pipeline 2. The hoses are then uncoupled and the check valves 39, 42 function to lock the cylinder 6 in the set or expanded mode. In this mode, the seal 30, stationary wedge 15 and cylinder 6 cooperate to seal the pipeline bore 32. With the two plugs 1 in the expanded state, installation and welding of the new section 4 of pipe is carried out. The bore 32 is then pressurized and, for each plug 1, the valve 47 is shifted to the open position, thereby creating fluid communication between the rod and head end sections 41, 44 of the chamber 9. The elastic seal ring 30 for each plug 1 then contracts, driving the travelling wedge 26, sleeve 20 and piston 7 to the collapsed position. The plugs 1 may then be pumped down the pipeline 2 to a pig trap and removed.

The scope of the invention is set forth in the claims now following.

The embodiments of the invention in which an exclusive property or privilege is claimed are defined as follows:

1. A vapor plug, adapted to be inserted into the open end of a pipeline and actuated to expand radially to seal the bore of the pipeline, said plug further being adapted to contract in response to the application of pressure through the bore of the pipeline, comprising:
   a cylinder forming a chamber and having a fluid-tight piston positioned to work therein;
   first passage means for injecting fluid into one end of the chamber and second passage means for removing fluid from the other end of the chamber;
   means forming a third passage for enabling fluid to move from one end of the cylinder chamber to the other;
   a valve, in communication with the bore of the pipeline and adapted to control fluid flow through the third passage, said valve being operative to be moved from a closed mode, in which fluid is blocked from moving through the third passage, and an open mode, in which fluid may move through the third passage, thereby freeing the piston for axial movement in the chamber, said valve being adapted to be moved from the closed mode to the open mode in response to the application of pressure in the bore of the pipeline;
   an elastic resilient seal ring carried by the cylinder and extending in a generally vertical plane, said ring being adapted, when expanded radially, to seal against the inner surface of the pipeline wall;
   means, connected with the cylinder piston, for radially expanding the seal ring; and
   normally closed valve means operative to close the ends of the first and second passage means to lock fluid in the cylinder, whereby the piston may be fixed in the ring-expanded mode, when the valve is in the closed mode;
   said seal ring being operative, when the valve is in the open mode, to contract, whereby the plug may be pumped down the pipeline.

2. A vapor plug, adapted to be inserted into the open end of a pipeline and actuated to expand radially to seal the bore of the pipeline, said plug further being adapted to contract in response to the application of pressure through the bore of the pipeline, comprising:
   a cylinder forming a chamber and having a fluid-tight piston positioned to work therein;
   first passage means for injecting fluid into one end of the chamber and second passage means for removing fluid from the other end of the chamber;
   means forming a third passage for enabling fluid to move from one end of the cylinder chamber to the other;
   a valve, in communication with the bore of the pipeline and adapted to control fluid flow through the third passage, said valve being operative to be moved from a closed mode, in which fluid is blocked from moving through the third passage, and an open mode, in which fluid may move through the third passage, thereby freeing the piston for axial movement in the chamber, said valve being adapted to be moved from the closed mode to the open mode in response to the application of pressure in the bore of the pipeline;
   an elastic resilient seal ring carried by the cylinder and extending in a generally vertical plane, said ring being adapted, when expanded radially, to seal against the inner surface of the pipeline wall;
   a first annular wedge associated with the cylinder and extending in a generally vertical plane;
   an axially movable second annular wedge associated with the cylinder and extending in a generally vertical plane, said second annular wedge being connected with the piston rod and being operable, when moved toward the first annular wedge, to co-act with said latter wedge to radially expand the seal ring;
   said seal ring cooperating with one of the wedges and the cylinder to seal the pipeline bore, when expanded; and
   check valve means operative to normally close the ends of the first and second passage means to lock fluid in the cylinder whereby the piston may be fixed in the ring-expanded mode, when the valve is in the closed mode;
   said seal ring being operative, when the valve is in the open mode, to contract, whereby the plug may be pumped down the pipeline.

3. A vapor plug, adapted to be inserted into the open end of a pipeline and hydraulically actuated to expand radially and seal the bore of the pipeline, said plug further being adapted to contract in response to the application of pressure through the bore of the pipeline, comprising:

a double-acting hydraulic cylinder forming a chamber and adapted to be inserted into the open end of the pipeline, whereby one end of the cylinder is the inner end and the other is the outer end, said cylinder having a piston in its chamber whose rod is at the inner end, said cylinder forming a first passage extending from its outer end and communicating with the rod end of the chamber, said cylinder forming a second passage extending from its outer end and communicating with the head end of the chamber, said cylinder forming a third passage which extends partway from each of the first and second passages toward the other;

the cylinder forming a plunger bore extending from its outer end and intersecting the third passage;

a plunger positioned in the plunger bore and forming a fourth passage extending transversely therethrough, said plunger being shiftable along the bore between closed and open positions whereby the fourth passage when in the open position connects the two ends of the third passage and completes communication between the rod and head ends of the chamber, said plunger being operative to interrupt the third passage when in the closed position, whereby fluid is prevented from moving between the first and second passages;

a sleeve surrounding the inner end of the cylinder and being connected to the rod;

a first annular wedge carried by the cylinder;

a second annular wedge also carried by the cylinder;

an elastic resilient seal ring carried by the wedges, whereby, when the piston and rod are shifted outwardly, the first wedge moves toward the second wedge and the seal ring is expanded radially into sealing contact with the pipeline, said cylinder, wedges, and seal ring being operative to close off the pipeline bore;

first and second couplings connecting with the cylinder, for introducing hydraulic fluid into the first passage and returning it from the second passage; and normally closed check valve means controlling each of the first and second passages at their outer ends whereby, when the cylinder has been hydraulically actuated and the seal ring expanded, the hydraulic fluid in the assembly is locked in place and the assembly remains expanded, whereby, when pipeline pressure is applied to the outer end of the expanded assembly the plunger will shift from the closed to the open position and allow the fluid pressure to equalize in the head and rod end sections of the chamber so that the seal ring may contract out of sealing relation with the pipeline.

4. A method for repairing a pipeline having a defect in the pipe wall, comprising:

cutting a length of pipe out of the pipeline, said length having the defect;

inserting into each open end of the pipeline a mechanical plug comprising a hydraulic cylinder, said cylinder being adapted when hydraulically actuated to radially expand a vertically disposed, elastic, resilient seal ring into sealing engagement with the inside surface of the pipeline wall, whereby the cylinder and seal ring seal the pipeline bore, said cylinder further comprising means for normally locking the fluid in it so that the seal ring remains expanded, said cylinder further comprising means, responsive to pressure applied through the bore of the pipeline, operative to enable the fluid in the cylinder to move freely between the ends of the cylinder chamber, whereby the seal ring may contract;

injecting hydraulic fluid into the cylinders to expand them into sealing relation with the pipeline wall;

welding a length of new pipe to the open ends of the pipeline to complete the pipeline;

pressurizing the pipeline bore to contract the seal rings; and pumping the contracted plugs downstream for recovery thereof.

* * * * *